United States Patent
Freeman et al.

(10) Patent No.: US 6,456,848 B1
(45) Date of Patent: Sep. 24, 2002

(54) ASSIGNING CELLULAR CHANNELS TO LOCKED AND UNLOCKED CELLS

(75) Inventors: David F Freeman, Billerica; Pete A. Boyer, Somerville, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/464,239

(22) Filed: Dec. 15, 1999

(51) Int. Cl.[7] ................................. A04Q 7/20

(52) U.S. Cl. ..................... 455/450; 455/452; 455/62

(58) Field of Search ............... 455/450, 452, 455/453, 455, 446, 62, 63

(56) References Cited

U.S. PATENT DOCUMENTS

| | | | |
|---|---|---|---|
| 4,670,899 A | 6/1987 | Brody et al. | 455/453 |
| 5,038,399 A | 8/1991 | Bruckert | 455/447 |
| 5,134,709 A | 7/1992 | Bi et al. | 455/452 |
| 5,148,548 A | 9/1992 | Meche et al. | 455/514 |
| 5,355,367 A | 10/1994 | Comroe et al. | 370/95.1 |
| 5,430,761 A | 7/1995 | Bruckert et al. | 375/200 |
| 5,437,054 A | 7/1995 | Rappaport et al. | 455/447 |
| 5,448,621 A | 9/1995 | Knudsen | 455/427 |
| 5,448,751 A * | 9/1995 | Takenaka et al. | 455/450 |
| 5,483,666 A | 1/1996 | Yamada et al. | 455/454 |
| 5,513,379 A | 4/1996 | Benveniste et al. | 455/451 |
| 5,574,466 A | 11/1996 | Reed et al. | 342/359 |
| 5,603,085 A | 2/1997 | Shedlo | 455/450 |
| 5,666,655 A | 9/1997 | Ishikawa et al. | 455/512 |
| 5,710,758 A | 1/1998 | Soliman et al. | 370/241 |
| 5,726,978 A | 3/1998 | Frodigh et al. | 370/252 |
| 5,859,841 A | 1/1999 | Gitlits | 370/335 |
| 5,926,763 A | 7/1999 | Greene, Sr. et al. | 455/450 |
| 5,956,643 A * | 9/1999 | Benveniste | 455/452 |
| 5,963,867 A | 10/1999 | Reynolds et al. | 455/457 |

OTHER PUBLICATIONS

K.N. Sivarajan, R.J. McEliece, J.W. Ketchum; *Channel Assignment in Cellular Radio*; GTE Laboratories; CH2379–1/89/0000/0846; IEEE; (pp. 846–850).

A. Gamst, W. Rave; *On Frequency Assignment in Mobile Automatic Telephone Systems*; Phillips GmbH Forschungslaboratorium, Hamburg, Germany; CH 1819–2/82–0000–0309; 1982 IEEE; (pp. 309–315).

J. Plehn; *Applied Frequency Assignment*; DeTeMobil, Bonn, Germany; 0–7803–1927–3/94; 1994 IEEE; (pp. 853–857).

M. Grevel, A. Sachs; A Graph Theoretical Analysis of Dynamic Channel Assignment Algorithms for Mobile Radiocommunication Systems; Siemens Forsch.–u. Entwickl.–Ber. Bd.12 (1983) Nr.5 © Springer–Verlag 1983 (pp. 298–305).

(List continued on next page.)

*Primary Examiner*—Nay Maung
*Assistant Examiner*—Quochien B. Vuong
(74) *Attorney, Agent, or Firm*—James K. Weixel (57) ABSTRACT

Channels are assigned (56) to a subject cellular network (12) after taking into account the locked/unlocked status of cells (20). Channels are assigned to locked cells (20') in accordance with a prearranged assignment plan (36). After this assignment, one unlocked cell (20") is selected (50) at a time. An available channels list is built (54) for the selected unlocked cell (20"), and a channel is selected (56) from this list for assignment to the selected unlocked cell (20"). The available channels list is built (54) by evaluating all channels in the network (12) one at a time to determine if their assignment to the selected unlocked cell (20") would cause undue interference in any other cell (20) of the network (12). If interference worse than a minimum system threshold is detected (82) in another cell (20), a channel is made unavailable for assignment unless it is a locked cell (20"). For a locked cell it is made unavailable (92) if the channel assignment would worsen interference by more than an offset value.

24 Claims, 4 Drawing Sheets

OTHER PUBLICATIONS

Z. Xu, P.B. Mirchandani; Virtually Fixed Channel Assignment For Cellular Radio–Telephone Systems: A Model and Evaluation; ICC '92; 92CH3132–8/0000–1037; 1992 IEEE (pp. 1037–1041).

T.J. Kahwa, N.D. Georganas; A Hybrid Channel Assignment Scheme in Large–Scale, Cellular–Structured Mobile Communication Systems; IEEE Transactions on Communications, vol. Com–26, No. 4, Apr. 1978 (pp. 432–438).

D.C. Cox, D.O. Reudink; Increasing Channel Occupancy in Large–Scale Mobile Radio Systems: Dynamic Channel REassignment; IEEE Transactions on Vehicular Technology, vol. VT–22, No. 4, Nov. 1973 (pp. 218–222).

L.G. Anderson; A Simulation Study of Some Dynamic Channel Assignment Algorithms in a High Capacity Mobile Telecommunications Systems; IEEE Transactions on Vehicular Technology, vol. VT–22, No. 4, Nov. 1973 (pp. 210–217).

H. Sekiguchi, H. Ishikawa, M. Koyama, H. Sawada; Techniques for Increasing Frequency Spectrum Utilization in Mobile Radio Communication System; Musashino Electrical Communications, Tokyo, Japan; CH2037–0/85/0000–0026; 1985 IEEE (pp. 26–31).

F. Box; A Heuristic Technique for Assigning Frequencies to Mobile Radio Nets; IEEE Transactions on Vehicular Technology, vol. VT–27, No. 2, May 1978 (pp. 57–64).

M. Duque–Antón, D. Kunz, B. Rüber; Channel Assignment for Cellular Radio Using Simulated Annealing; IEEE Transactions on Vehicular Technology, vol. 42, No. 1, Feb. 1993 (pp. 14–20).

Mobile Celluar Telecommunications, Analog and Digital Systems by W.C.Y. Lee; McGraw–Hill, Inc. (pp. 266–281).

* cited by examiner

| 36 | PREARRANGED ASSIGNMENT PLAN | | |
|---|---|---|---|
| | CELL TOWER LOCATION | TRANSMIT POWER | CHANNELS |
| SUBJECT NETWORK | --- <br> --- <br> --- | --- <br> --- <br> --- | ---, ---, ---, ---, ---, ---, ---, --- <br> ---, ---, ---, ---, ---, ---, ---, --- <br> ---, ---, ---, ---, ---, ---, ---, --- |
| NEIGHBOR NETWORK | --- <br> --- | --- <br> --- | ---, ---, ---, ---, ---, ---, ---, --- <br> ---, ---, ---, ---, ---, ---, ---, --- |

ASSIGNING CELLULAR CHANNELS TO LOCKED AND UNLOCKED CELLS

RELATED PATENTS

The present invention is related to the United States Patent entitled "Method And Apparatus For Assigning Frequencies In A Cellular Network," Ser. No. 08/850,187, Filed May 2, 1997, by Boyer et al., which is incorporated herein by reference.

TECHNICAL FIELD OF THE INVENTION

This invention relates generally to cellular telecommunications and more particularly to the assignment of channels in a cellular network.

BACKGROUND OF THE INVENTION

Providers of cellular telecommunication services wish to maintain minimum communication service quality standards when assigning channels to cells. They also wish to distribute and reuse channels as much as possible throughout their networks while maintaining at least the minimum quality standards. Failure to maintain minimum quality standards causes poor quality channels, which leads to customer dissatisfaction. Failure to distribute and reuse channels as much as possible throughout the network leads to increased blockage (i.e., busy signals) for customers and reduced revenues for the service provider.

A service provider's cellular network is often located adjacent to a neighbor network. The service provider's network and the neighbor network may share a common spectrum. The use of this common spectrum in one network's cells located at the border between the two networks has an effect on the other network. For example, at border cells a service provider's minimum quality standards may not be met due to the way the neighbor network uses the common spectrum. To reduce chaos which might otherwise result at border cells from the completely independent use of the common spectrum by the different networks, the neighbor networks often agree to specified channel assignments at their border cells. In other words, the different networks specify preset identities and locations of channels to be used for the long term in the border cells. As a result of such agreements, the network service providers have less freedom to alter the channel assignments in the border cells because an alteration could adversely affect the neighbor network and be in violation of the agreement. On the other hand, the network service providers have great freedom to assign channels as they see fit throughout the remainder of their own networks.

A channel assignment problem refers to the assignment and reuse of channels in a network's cells. Network service providers often use computer-based network automated channel assignment tools which, based on a wide variety of information sources, provide solutions to the channel assignment problem for the network. In other words, the automated channel assignment tools provide solutions which assign channels to cells to meet a wide variety of channel assignment constraints. Channel assignment constraints may include, among other factors, the assignment of channels so that minimum quality standards are maintained as thoroughly as possible throughout the network, and the predetermined assignment of certain channels to certain cells, such as cells located at network borders.

However, conventional automated channel assignment tools fail to adequately account for service quality degradation which may result from border cell agreements. A conventional automated channel assignment tool does not assign a channel to a cell if that assignment would cause service to degrade below the minimum quality standard at a remote cell. However, service quality may already be below the minimum quality standard at the remote cell as a result of a border cell agreement. Due to this pre-existing substandard quality, the conventional automated channel assignment tool resists assigning the channel for distances which are much greater than a typical reuse distance. In one example, the conventional automated channel assignment tool resists assigning the channel for a maximum propagation distance away from a border cell where the degraded service has been detected. The maximum propagation distance is a function of the curvature of the earth and is much greater than a typical reuse distance. Consequently, fewer channels are distributed throughout the network than desired, and customers are more likely to experience blockages.

What is needed therefore is an improved apparatus and method for an automated channel assignment tool which adequately accounts for the service quality degradation which may result from border cell agreements.

SUMMARY OF THE INVENTION

Accordingly, it is an advantage of the present invention that an improved method and computerized apparatus for assigning cellular channels to locked and unlocked cells are provided.

Another advantage is that an automated channel assignment tool which adequately accounts for the service quality degradation which may result from border cell agreements is provided.

Another advantage is that channels are assigned to interior cells of a network so long as such assignments make no more than an insignificant deterioration in service quality at border cells which experience degraded service quality due to a prearranged assignment.

Another advantage is that, except for cells which are subject to prearranged channel assignments, channels are assigned to cells so that no cell experiences less than a minimum service quality.

The above and other advantages of the present invention are carried out in one form by a method for assigning channels in a cellular network to locked cells having prearranged channel assignments and to unlocked cells having channel assignments that are not prearranged. The method calls for allotting channels to the locked cells in accordance with a prearranged assignment plan to effect assignment of the channels in the locked cells. First interference statistics are calculated to characterize interference at the locked cells for the channels. An allotment of a first one of the channels to a first one of the unlocked cells is simulated. Second interference statistics are then calculated to characterize interference at the locked cells for the first channel in response to the simulation. The first channel is allotted to the first unlocked cell to effect an assignment of the first channel in the first unlocked cell if the second interference statistics indicate less interference for the first channel than is indicated by the first interference statistics for the first channel.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
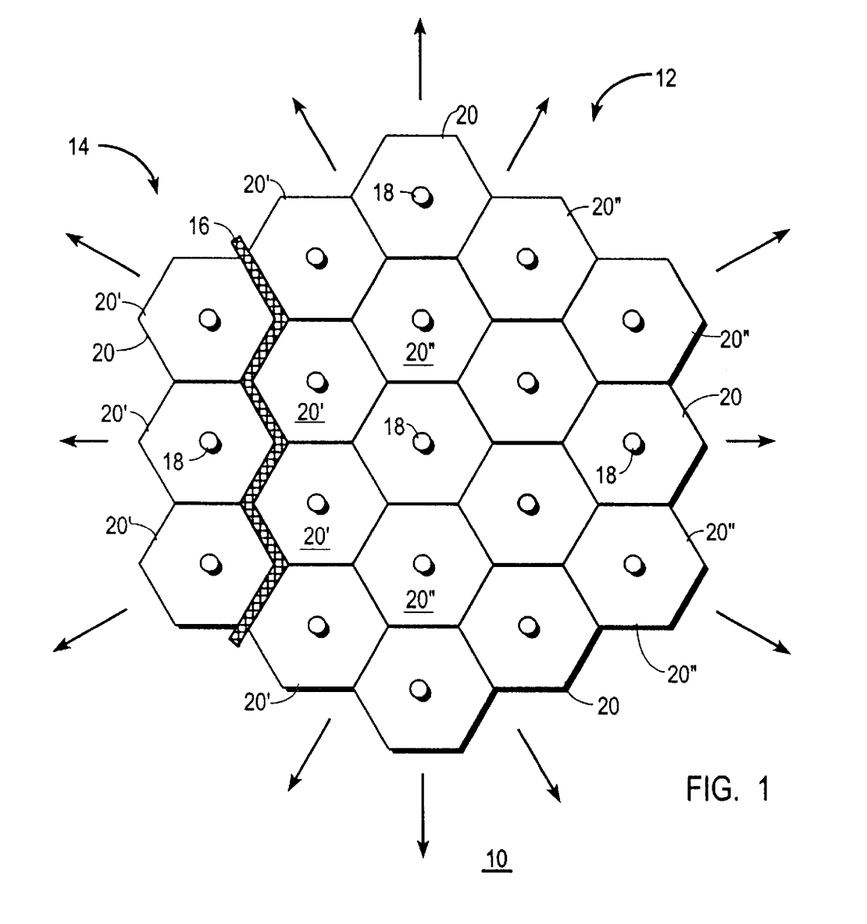
FIG. 1 shows a schematic layout diagram of an environment in which neighboring cellular radio communication networks share a common border.

FIG. 1 shows a schematic layout diagram of an environment 10 in which a first cellular RF communication network 12 and a second cellular RF communication network 14 reside. First network 12 is adjacent to second network 14 at a border 16. First and second networks 12 and 14 share a common spectrum which is configured as a pool of bi-directional channels. Accordingly, at and around border 16 the use of this common spectrum by second network 14 limits the freedom first network 12 has in using the common spectrum while maintaining minimum channel quality standards. The discussion below is presented from the perspective of assigning cellular channels in first network 12, which is also referred to as subject network 12, to account for channel assignments at border 16 with first network 14, which is also referred to as neighbor network 14.

Each of subject and neighbor networks 12 and 14 includes any number of land stations or base stations 18. Each base station 18 controls at least one cell 20 or a face or sector of a cell 20. In other words, each cell 20 is associated with a base station 18 and vice-versa. For purposes of the present description, the term "cell" hereinafter applies both to an entire cell and to an individual face or sector of a cell. Base stations 18 may couple to mobile telephone switching offices (not shown) in a manner well known in the art.

Cells 20 which reside at border 16 are referred to as border cells 20', and cells 20 which are not adjacent to a border are referred to as interior cells 20". Border cells 20' are also referred to as locked cells 20' below because border cells 20' may be subject to a prearranged channel assignment agreement between subject network 12 and neighbor network 14. This agreement specifies the channels to be assigned by subject network 12 and neighbor network 14 in border cells 20'. Thus, the agreement essentially locks the channel assignments for border cells 20' so that subject network 12 does not have the freedom to change such channel assignments at will. Conversely, interior cells 20' are also referred to below as unlocked cells 20" because subject network 12 has great freedom to make and alter channel assignments therein as it sees fit. While locked cells 20' tend to reside at border 16 and unlocked cells 20" tend to reside away from border 16 in a typical scenario, this is not a requirement. In certain situations, some locked cells 20' may not be located at or even near border 16 and/or some unlocked cells 20" may reside at border 16.

FIG. 1 illustrates cells 20 as being non-overlapping, regular, hexagonal shapes of equal size and without intervening gaps. This regular hexagonal representation is convenient for schematically denoting a cell's area. However, those skilled in the art will appreciate that the actual shape and size of cells 20 will vary widely from cell to cell, and that overlap and gaps will appear between cells 20. Moreover, FIG. 1 exaggerates border 16 for clarity. Those skilled in the art will appreciate that no structure is required to denote border 16 and that border 16 simply indicates the place where the jurisdiction of subject network 12 ends and the jurisdiction of neighbor network 14 begins.

Figure 2:
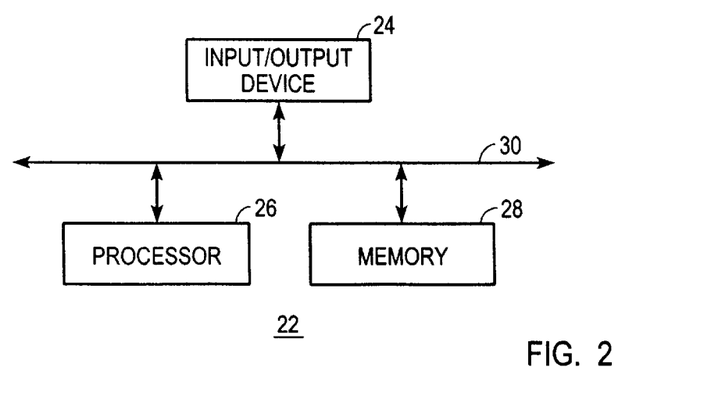
FIG. 2 shows a block diagram of a general purpose computer suitable for practicing one embodiment of the present invention.

The present invention provides a method and apparatus for assigning channels in subject network 12 (FIG. 1). The invention may be practiced using a programmed computer such as the general purpose computer 22 illustrated in the block diagram of FIG. 2. Referring to FIG. 2, computer 22 includes an input/output device 24, a processor 26, memory 28, all connected to a bus 30. In response to commands, in the form of computer signals, from input/output device 24, processor 26 executes one or more computer programs stored, at least temporarily, in memory 28 to generate channel assignments for subject network 12 (FIG. 1).

Other hardware configurations are suitable for general purpose computer 22, and are intended to be within the scope of the invention. For example, input/output device 24 may include separate devices such as a mouse, keyboard, display terminal, printer, network interface, and/or any other device that performs input or output. Processor 26 may include a single processing device (e.g., a microprocessor), or multiple processing devices. Memory 28 may include primary memory such as semiconductor memory, secondary memory such as magnetic disk or a tape, CD memory, and/or any other conventional computer storage device.

The above-described programmed computer may perform the methods of the invention for assigning channels in subject network 12 (FIG. 1). According to another embodiment of the invention, a programmed distributed processing system may perform the methods of assigning channels. According to yet another embodiment of the invention, an apparatus may be specially constructed to perform the methods of assigning channels. For simplicity, various embodiments of the method will be described with reference to programmed general purpose computer 22 shown in FIG. 2. However, it should be understood that the methods of the invention may be performed by any of the above-described apparatus, including but not limited to the programmed distributed processing system, the specially constructed apparatus, or any other machine configured to perform the methods.

The programmed computer performs a method of assigning channels to cells 20 (FIG. 1) in subject network 12 (FIG. 1) when processor 26 executes the one or more programs stored in memory 28. In particular, processor 26 generates a difficulty factor, discussed below, for each unlocked cell 20" (FIG. 1) of subject network 12, selects an unlocked cell 20" based on each cell's difficulty factor, and selects a channel for the selected unlocked cell 20". By repeating these steps, processor 26 produces channel assignments that are used to operate subject network 12. In particular, the channel assignments define the carrier frequencies, CDMA PN offsets, and/or other channelizing parameters used to communicate between the base station and each of the cellular radio telephones (not shown) in each cell 20 of subject network 12. The number of channels assigned to a cell 20 depends, at least in part, on the expected volume of calls in the cell 20.

Figure 3:
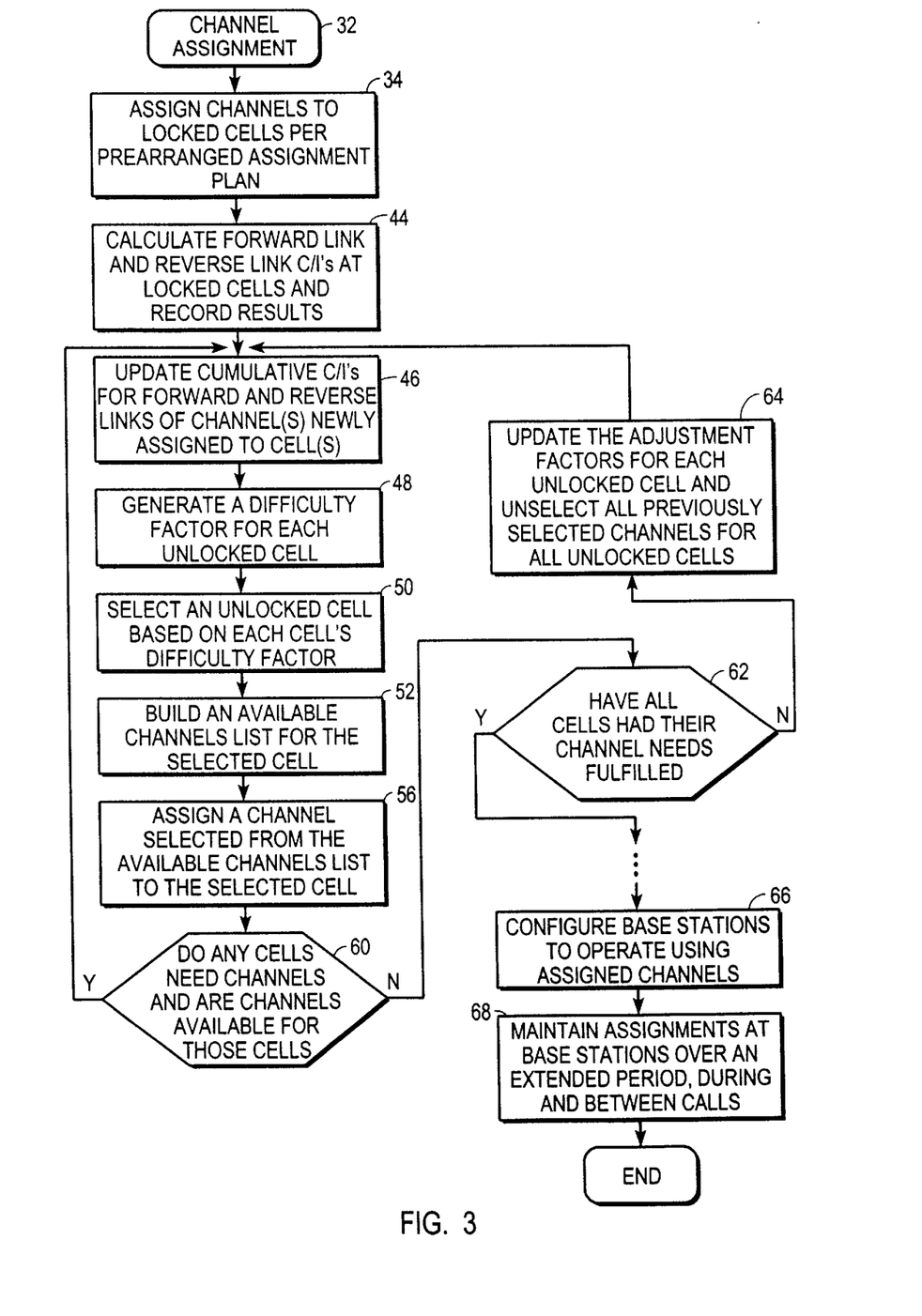
FIG. 3 shows a flow chart of a channel assignment process performed in accordance with one embodiment of the present invention.

FIG. 3 shows a flow chart of a channel assignment process 32 performed by programmed computer 22 (FIG. 2) in accordance with one embodiment of the present invention. Process 32 may be initiated in response to user input.

Figure 4:
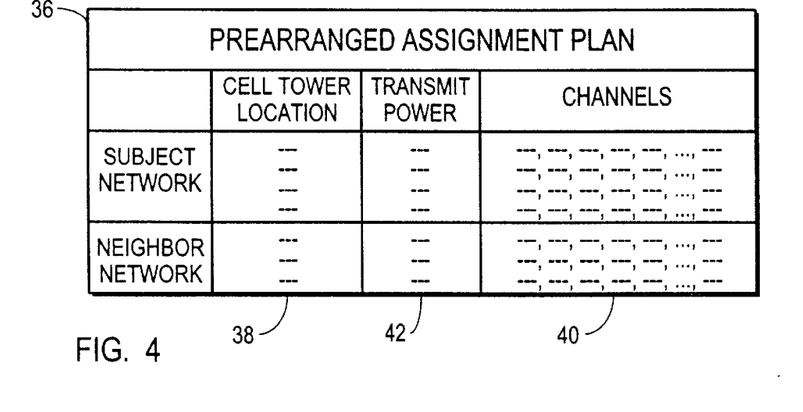
FIG. 4 shows an exemplary table which characterizes a prearranged assignment plan that affects cells located at a border between two neighboring cellular radio communication networks.

Process 32 includes a task 34 which assigns or allots channels to locked cells 20' (FIG. 1) in accordance with a prearranged assignment plan 36, an exemplary tabular representation of which is presented in FIG. 4. Prearranged assignment plan 36 may result from an agreement between the service providers in subject network 12 (FIG. 1) and neighbor network 14 (FIG. 1), but prearranged assignment plan 36 may also result from any other criteria or whim that the service provider of subject network 12 may wish to apply.

Referring briefly to FIG. 4, prearranged assignment plan 36 specifies that certain locked cells 20' (FIG. 1), as identified through a cell tower location column 38 in plan 36, are to have certain bi-directional channels assigned thereto, as identified through a channels column 40. Plan 36 may include additional information, such as maximum transmission power for each locked cell 20', as identified through a transmit power column 42, and/or other information as may be desirable. Plan 36 may include such information for both subject network 12 and neighbor network 14. Dashes in FIG. 4 represent geographical location data, transmission power level data, channel identity data, and the like.

Referring back to FIG. 3, by assigning or allotting channels to locked cells 20' in task 34, unless the assignments are later changed, the identified locked cells 20' will use the assigned or allotted channels in conducting calls. Desirably, task 34 assigns channels to neighbor network locked cells 20' as well as to subject network locked cells 20' so that the neighbor network locked cells 20' may be accounted for in subsequent assignments of channels to unlocked cells 20" in subject network 12. As a result of the assignments in task 34, channel quality in at least one of subject network locked cells 20' is likely to degrade beneath a predetermined quality level that service providers in subject network 12 try to maintain throughout subject network 12. However, the service providers may not have the freedom to alter channel assignments to improve such degraded channel quality due to an agreement with the service providers in neighbor network 14 or for other reasons.

After channels are assigned to locked cells 20' in task 34, a task 44 calculates statistics which characterize interference at locked cells 20' for subject network 12 and records the calculation results. In the preferred embodiment, task 44 calculates carrier signal strength to interference signal strength ratios (C/I's) for both forward and reverse links of the various bi-directional channels. Forward links are used to convey communications from base stations 18 (FIG. 1) to radio telephones, and reverse links convey communications from radio telephones to base stations 18. In one embodiment, C/I's are separately calculated and evaluated for co-channel interference, adjacent channel interference, and nearly adjacent channel interference. In another embodiment, forward channel, reverse channel, co-channel, and adjacent channel C/I's are combined into a common interference statistic which is then evaluated. In other embodiments, alternate statistics such as bit or data error rates may be devised to characterize interference and/or other signal quality factors.

At task 44, all channels assigned to locked cells 20' in task 34 are simulated as being in use. Using modeling techniques known to those skilled in the art, interference is then characterized in all cells in response to the channels simulated as being in use at locked cells 20'. In the preferred embodiments, interference modeling techniques separately calculate interference statistics for forward and reverse links of each bi-directional channel in each locked cell 20'. Interference calculations are also desirably based upon such factors as cell tower locations, cell transmission power, cell antenna patterns and a geographical data base describing the terrain, foliage, buildings, and possibly building materials.

After task 44, a task 46 begins a programming loop that continues until channel needs for all cells 20 have been fulfilled by channel assignments. Task 46 updates cumulative carrier-to-interference ratios (C/I's) of channels which may have been newly assigned to cells. At the first iteration of task 46, the results of the previous task 44 are simply used as the cumulative total.

During subsequent iterations of the programming loop, task 46 determines the interference effect in all channels and at all cells 20 of assigning a specified channel to a specified unlocked cell 20". Selected C/I ratios recorded for the channels at cells 20 are lowered by an amount which is determined in response to interference calculations similar to those discussed above in connection with task 44. Only the newly specified channel and related channels, such as adjacent channels, need be evaluated in task 46 in these subsequent iterations, and the unlocked cell 20" to which the newly specified channel was assigned may be omitted from the evaluation of task 46 in these subsequent iterations.

As will be discussed below, on occasion channels will be unassigned en masse. When task 46 is performed after such events, task 46 evaluates the interference consequence of the unassignment on all channels in all cells 20.

To give an overview, after task 46, a task 48 generates a difficulty factor for each unlocked cell 20" in subject network 12. In a subsequent task 50, computer 22 (FIG. 2) selects an unlocked cell 20" based on each unlocked cell's difficulty factor. Then, in a task 52 a process 54 is performed to build an available channels list for the unlocked cell 20" selected in task 50. Process 54 is discussed in more detail below in connection with FIG. 5. After task 52, a task 56 performs a process 58 to assign a channel to the unlocked cell 20" selected above in task 50 from the channels included by task 52 in the available channels list for that unlocked cell 20". Process 58 is discussed in more detail below in connection with FIG. 6.

Following task 56, a query task 60 determines whether there are any unlocked cells 20" in subject network 12 that need channels, and whether channels are available for those unlocked cells 20". If the answer is "yes" to both questions, program control in process 32 loops back and repeats tasks 46, 48, 50, 52, and 56 to assign another channel to the same or another unlocked cell 20".

If the answer is "no" to either question in task 60, a query task 62 determines whether every unlocked cell 20" has had its channel needs fulfilled. If the answer is "no" at task 62, a task 64 updates the adjustment factor for each unlocked cell 20", revokes the assignment of all previously assigned channels en masse for all unlocked cells 20", and loops back to task 46 repeat the channel assignment process for unlocked cells 20" using the new adjustment factors.

Each loop through tasks 46, 48, 50, 52, 56 and 60 is called a "pass" herein. Each loop which includes any number of passes and additionally includes tasks 62 and 64 is called an "iteration" herein. The programmed computer 22 may be able to complete the assignment of channels in one iteration, i.e., without ever looping back to task 46 from task 62. Such a situation may occur when the pool of available channels is large relative to the number of channels required by cells 20 of subject network 12. However, computer 22 may need to perform several iterations before it is able to fulfill the channel needs of each unlocked cell 20" and complete the assignment of channels in subject network 12. The channel needs of locked cells 20' are fulfilled by task 34, and the needs of neighbor network 14 are of no concern to the service provider of subject network 12.

According to an embodiment of the invention, computer 22, in task 48, generates each unlocked cell's difficulty factor based on an adjustment factor for that unlocked cell 20". During a first iteration, the adjustment factors for each unlocked cell 20" are set equal to 0. In task 64, the adjustment factor for each unlocked cell 20" is updated based on whether the unlocked cell 20" was deemed to be an "easy" cell (i.e., process 32 fulfilled the cell's channel requirements during the iteration), or a "hard" cell (i.e., process 32 did not fulfill the cell's channel requirements during the iteration). In task 64, for each "hard" cell, the cell's adjustment factor is determined according to equation (1).

$$\text{Adjustment factor} = \text{Number of unfilled channels for the "hard" cell} \qquad \text{Eq.(1).}$$

For each "easy" cell, task 64 sets the cell's adjustment factor according to equation (2).

$$\text{Adjustment factor} = (-1) \cdot (U/A) \cdot L \qquad \text{Eq.(2).}$$

where:

U=sum of all unfilled needs over all cells,

A=sum of all the available channels over all cells after the last assignment, and L=number of available channels for the "easy" cell after the last assignment for the "easy" cell.

The fraction (U/A) forces the sum of all adjustment factors to be zero so that there is no net increase or decrease in overall adjusted difficulty. As a result, the "easy" cells are made "easier" by the same amount that the "hard" cells are made "harder".

When task 62 eventually determines that all unlocked cells 20" have had their channel needs fulfilled, the assignment of channels is complete. As indicated by ellipses in FIG. 3, a wide range of tasks may be performed to alter the channel adjustments. For example, process 32 may be repeated locking the assignments for some or most of cells 20 that were previously unlocked in the earlier performance of process 32 with the channel assignments determined by that previous performance. In another example, the channel assignments may be manually adjusted.

After final adjustments, a task 66 is performed to configure base stations 18 (FIG. 1) to operate using the channels assigned to the associated cells 20. In particular, to the extent needed equipment is acquired, installed, tuned, and placed in service so as to use the channel assignments. Following task 66, a task 68 maintains the assignments at the respective base stations 18 over a long term period that extends during calls which use the assigned channels to convey communications and during the intervening periods between calls where some or all of the assigned channels are not being used. In a typical scenario channel assignments may be maintained for a period of several weeks or months. By being able to maintain the channel assignments for extended periods that include durations where the channels are not actually being used, the existing cellular infrastructure may be used without requiring the expense of extensive equipment revisions necessary for a more dynamic channel assignment scheme.

Figure 5:
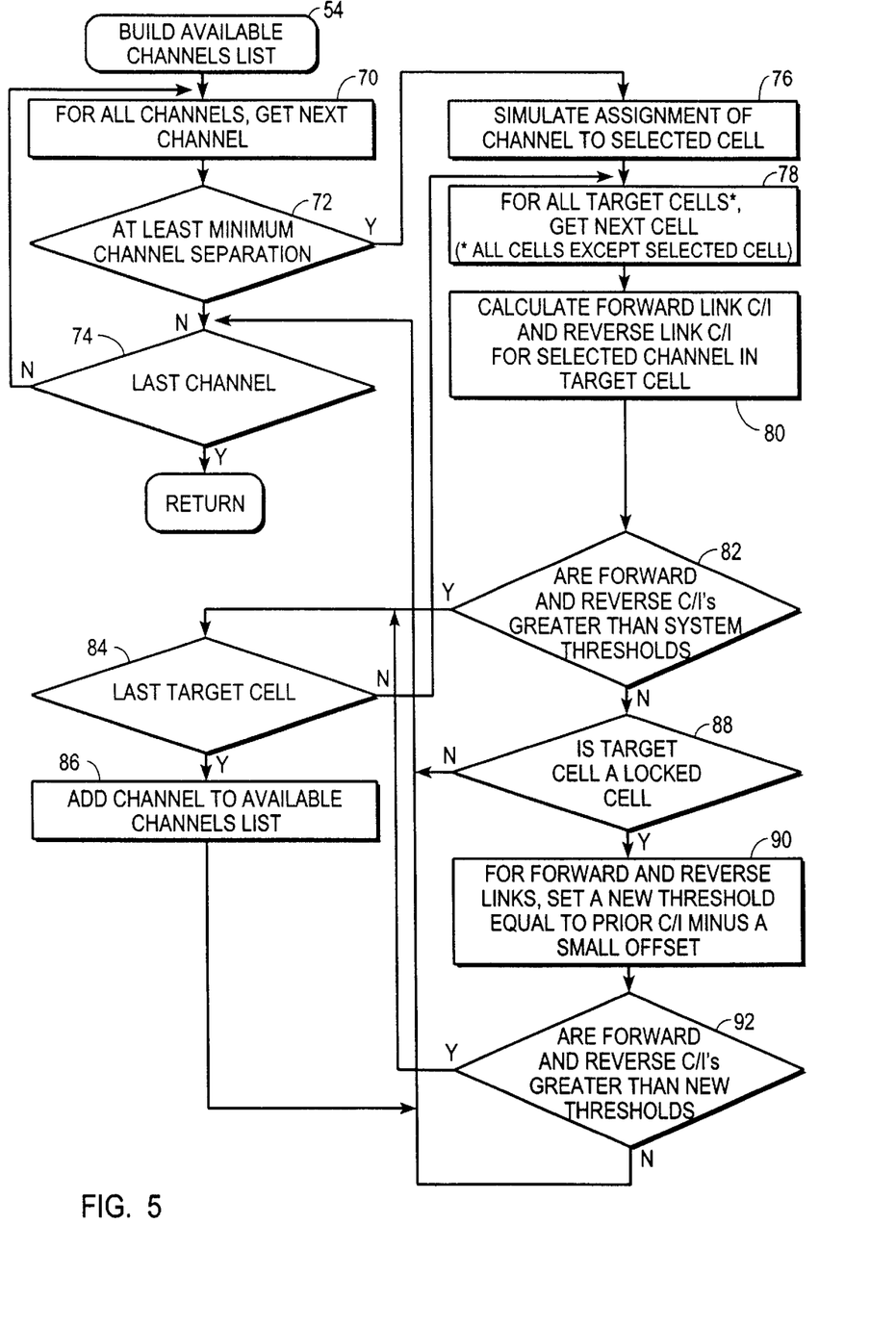
FIG. 5 shows a flow chart of a build available channels list process performed as a part of the channel assignment process of FIG. 3.

As discussed above, task 52 performs a process 54 which builds an available channels list from which task 56 selects a channel to assign to the selected unlocked cell 20" for each pass of the programming loop of process 32. A flow chart of process 54 is shown in FIG. 5.

Process 54 is performed when an unlocked cell 20" has been selected to receive a channel assignment. Process 54 may be implemented using nested programming loops, with an outer loop cycling through all channels in the pool of channels available to subject network 12 and an inner loop cycling through nearly all cells 20 in subject network 12 for the channel which is the subject of a particular iteration of the outer loop. A task 70 is used in managing the outer loop. Task 70 gets or selects the next channel from the pool of all channels available to subject network 12. Before exiting process 54, all channels available to subject network 12 will be selected. The last channel to be selected is referred to as the nth channel herein.

Next, a query task 72 determines whether the selected channel meets at least minimum channel separation constraints imposed on subject network 12. Channel separation constraints prevent the assignment of the same and possibly a small group of adjacent channels to a cell 20 in which the channel has already been assigned. Likewise, such constraints prevent the assignment of the same and possibly a couple or few adjacent channels to a cell 20 that is adjacent or otherwise near a cell 20 in which the channel has already been assigned. Such channels which do not meet minimum channel separation constraints may be deemed as unsuitable for inclusion in the available channels list for the selected unlocked cell 20" and filtered out immediately at task 72 without the need for further processing.

When task 72 detects such a channel, a query task 74 determines whether that channel was the last or nth channel. If the nth channel has been detected, program flow exits process 54 and proceeds to task 56 (FIG. 3) as discussed above. At this point the available channels list will have been built by evaluating all channels for the selected unlocked cell 20".

When task 74 determines that the selected channel is not the nth channel, program flow loops back to task 70 to perform another iteration of the outer loop and evaluate the next channel for possible inclusion in the available channels list for the selected unlocked cell 20".

When task 72 detects that a selected channel meets minimum channel separation constraints, a task 76 simulates the assignment or allotment of the selected channel to the selected unlocked cell 20". The simulation of task 76 occurs for the purpose of subsequent calculations and does not represent the assignment of a channel to the selected unlocked cell 20".

After task 76, a task 78 is used in managing the inner programming loop. Task 78 gets or selects the next target cell for subsequent interference calculations. A goal of the subsequent interference calculations is to determine the interference effect of assigning the selected channel in the selected unlocked cell 20" on all other cells 20 in subject network 12. Hence, a target cell for the purposes of the inner programming loop is any and eventually all cells other than the unlocked cell 20" that has been selected to receive a channel assignment prior to entering process 54. The target cells include all locked cells 20' and all unlocked cells 20", except for the unlocked cell 20" selected to receive a channel assignment. The last target cell to be selected is referred to as the nth target cell herein.

After task 78, a task 80 separately calculates forward link C/I and reverse link C/I for the selected channel in the target cell based upon the simulation of task 76. In the preferred embodiment, the calculations are performed using interference modeling techniques similar to those discussed above in connection with task 44 (FIG. 3). The results are recorded, at least temporarily, in association with the target cell and selected frequency.

Following task 80, a query task 82 determines whether both of the forward and reverse link C/I's calculated above in task 80 are greater than a predetermined interference level referred to below as a system threshold. A C/I in excess of the system threshold indicates less interference than the minimum system requirements. With a C/I in excess of the system threshold, the selected channel would be deemed to cause sufficiently low interference in the target cell as to be available for use, if it likewise causes sufficiently low interference in all other target cells. The system threshold is set by a user of computer 22 (FIG. 2) as desired. A C/I value of around 18 dB may be viewed as being typical for the system threshold, but this is by no means a requirement of the present invention.

If task 82 determines that each of the forward link and reverse link C/I's exceed the system threshold, a query task 84 determines whether the current target cell is the last or nth target cell. If the current target cell is not the last target cell, then program flow loops back to task 78 in accordance with the inner programming loop to evaluate the selected channel at another target cell. As discussed below, the inner programming loop exits back to the outer programming loop when a determination is made that a selected channel causes too much interference in any target cell and therefore should not be included on the available channels list. Task 84 is performed only if such a determination has not been made. Accordingly, when task 84 determines that the last target cell has been evaluated, a task 86 adds the channel to the available channels list, which is simply a list of channel identities. After task 86, program flow exits to the outer programming loop by proceeding to task 74.

When task 82 determines that either one of the forward link and reverse link C/I's calculated in task 80 is less than the system threshold, a query task 88 is performed. Task 88 determines whether the target cell is a locked cell 20'. The determination may be made by evaluating locked/unlocked status data (not shown) associated with cell 20 identities. Alternatively, the determination may be made by removing the effects of the simulation of task 76 and determining if the resulting C/I's for the selected channel in that target cell are less than the system threshold. If the target cell is not a locked cell 20' (i.e., is an unlocked cell 20"), program flow exits to the outer programming loop by proceeding to task 74. The selected channel will not be included on the available channels list. Accordingly, task 88 prevents the quality of service within subject network 12 from going below the service quality achievable using the system threshold at all except locked cells 20'. Further evaluation is performed for locked cells 20'.

When task 88 determines that the target cell is a locked cell 20', a task 90 sets a new threshold to be used in lieu of the system threshold. Task 90 sets new thresholds for each of the forward and reverse links to be slightly lower than the original C/I calculated for that target cell and selected channel above in task 44 (FIG. 3). In other words, task 90 subtracts a small offset from a prior C/I calculated for the target cell and the selected channel and uses the resulting value as a new threshold.

Following task 90, a query task 92 determines whether the forward and reverse link C/I's separately calculated above in task 80 are greater than the new forward and reverse link thresholds calculated above in task 90. If each of the forward and reverse link C/I's is greater than the corresponding new threshold for the target locked cell 20', then the selected channel is still deemed to be available for inclusion on the available channels list even though interference greater than the system threshold is being detected in the target locked cell 20'. In this situation, program flow continues to task 84 to evaluate the selected channel in the next target cell or include the selected channel in the available channels list if the nth target cell has been evaluated. If either the forward or reverse link C/I is less than the corresponding new threshold, then the selected channel is deemed to be unavailable for assignment to the selected unlocked cell 20", and program flow exits the inner programming loop by proceeding to task 74.

Together, tasks 90 and 92 allow service quality in locked cells 20' to degrade a small amount, if necessary, from service quality achievable if a channel were not assigned in a remote unlocked cell 20". This degradation is permitted even when the locked cells 20' are already experiencing service quality beneath system standards. That small amount is determined by the offset subtracted in task 90. Desirably, the offset is less than 2.0 dB. At this level neighbor network 14 border assignments over which subject network 12 has no control do not penalize subject network 12 by limiting the reuse of channels distributed throughout subject network 12. More desirably, the offset is less than 0.3 dB. At this level the degradation of service quality is so small that it is practically undetectable by customers of subject network 12, and the amount of channel reuse is not seriously influenced.

In the preferred embodiment, the offset is set even as low as 0.1 dB to make any degradation in service insignificant while still not seriously influencing channel reuse. Such a small offset is usable because the dominant influence over the C/I's calculated in task 80 are from the locked cells 20', with the unlocked cell 20" to which an assignment has been simulated in task 76 asserting only a small influence. Moreover, with a sufficiently small offset, such as 0.1 dB, computer 22 may be configured so as not to consume memory saving original C/I ratios from task 44. In this alternate embodiment, the prior C/I's referenced in task 90 may be determined from a prior pass of the programming loop of process 32 (FIG. 3). Other assignments of channels to other unlocked cells 20' may cause further deterioration in C/I for certain unlocked cells 20', but the offset is so small that the cumulative deterioration is still practically undetectable.

Figure 6:
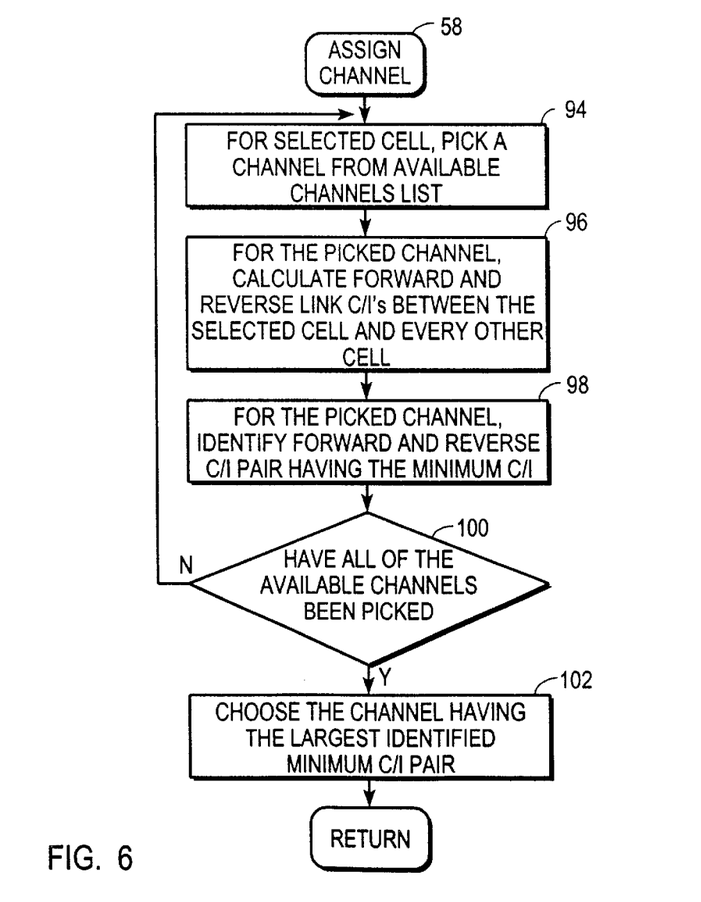
FIG. 6 shows a flow chart of an assign channel process performed as a part of the channel assignment process of FIG. 3.

As discussed above, task 56 (FIG. 3) performs a process 58 which assigns a channel selected from the available channels list to the selected unlocked cell 20" for each pass of the programming loop of process 32. A flow chart of process 58 is shown in FIG. 6.

Process 58 is performed when an unlocked cell 20" has been selected to receive a channel assignment, and the available channels list has been built for the selected unlocked cell 20". Process 58 includes a task 94 in which one channel is picked from the available channels list. In a subsequent task 96, for the channel picked in 94, process 58 determines C/I ratios between the selected unlocked cell 20" and each of the other cells 20 in subject network 12 for the picked channel. In the preferred embodiment, task 96 separately calculates C/I's for forward and reverse links of the picked channel. Next, in a task 98 the smallest or minimum C/I is identified from all the C/I's calculated in task 96. The smallest C/I represents the worst interference relationship between the selected unlocked cell 20" and a use of the picked channel at another cell 20.

After task 98, a query task 100 determines whether all of the channels listed in the available channels list have been picked. If the answer is "no", process 58 loops back and repeats tasks 94, 96, 98 and 100. If the answer is "yes", a task 102 is performed. Upon initiating task 102, process 58 has identified the smallest C/I's, i.e., the worst interference relationship, between the selected unlocked cell 20" and another cell 20, for the forward and reverse links of each available channel. In task 102, process 58 chooses from these "smallest" C/I forward and reverse link pairs that channel which has the largest forward and reverse link C/I's, i.e., that channel which is the least likely to be affected by interference from a particular source, as the selected channel for the unlocked cell 20" selected in task 50 (FIG. 3). As a result of task 102, the chosen channel is assigned to the selected unlocked cell 20".

If there is a tie between two or more channels, task 102 is desirably consistent in choosing one of the channels as the selected channel. In one embodiment, if there is a tie between two or more channels, task 102 selects the lowest frequency of the tied channels. In another embodiment, task 102 selects the highest frequency of the tied channels.

After task 102, program control proceeds to task 60, discussed above in connection with FIG. 3.

In summary, the present invention provides an improved method and computerized apparatus for assigning cellular channels to locked and unlocked cells. An automated channel assignment tool which adequately accounts for the service quality degradation that may result from border cell agreements is provided. Channels are assigned to interior or other unlocked cells of a network so long as such assignments make no more than an insignificant deterioration in service quality at border or other locked cells which experience degraded service quality due to a prearranged assignment. Except for cells which are subject to prearranged channel assignments, channels are assigned to cells so that no cell experiences less than a minimum service quality.

Although the preferred embodiments of the present invention have been illustrated and described in detail, it will be readily apparent to those skilled in the art that various modifications and equivalents may be made therein without departing from the spirit of the invention or from the scope of the appended claims. For example, those skilled in the art will appreciate that the sequencing and grouping of tasks herein described can be greatly altered while achieving equivalent results. Computer program segments may be configured to perform tasks similar to those discussed herein or otherwise in a one-to-one correspondence, with multiple tasks per segment, multiple segments per task, and different segments may be obtained by performing the same task at different times. These and other changes and modifications are intended to be included within the scope of the present invention.

What is claimed is:

1. A method for assigning channels in a cellular network to locked cells having prearranged channel assignments and to unlocked cells having channel assignments that are not prearranged, said method comprising:

a) allotting channels to said locked cells in accordance with a prearranged assignment plan to effect assignment of said channels in said locked cells;

b) calculating first interference statistics characterizing interference at said locked cells for said channels;

c) simulating an allotment of a first one of said channels to a first one of said unlocked cells;

d) calculating second interference statistics characterizing interference at said locked cells for said first channel in response to said simulating activity c); and e) allotting said first channel to said first unlocked cell to effect an assignment of said first channel in said first unlocked cell if said second interference statistics indicate less interference for said first channel than is indicated by said first interference statistics for said first channel.

2. A method as claimed in claim 1 wherein said locked cells are border cells for said cellular network.

3. A method as claimed in claim 1 wherein said first and second interference statistics represent ratios of carrier signal strength to interference signal strength.

4. A method as claimed in claim 1 wherein:

a base station of said cellular network is associated with said first unlocked cell; and said allotting activity e) comprises configuring said base station to operate using said first channel.

5. A method as claimed in claim 1 wherein said allotting activity e) comprises continuously maintaining said assignment of said first channel in said first cell while said base station engages in a plurality of calls using said first channel and between said calls when said base station does not use said first channel.

6. A method as claimed in claim 1 wherein:

said channels are bidirectional channels having forward and reverse links;

said first interference statistics separately characterize interference at said locked cells for forward links of said channels and for reverse links of said channels;

said second interference statistics separately characterize interference at said locked cells for said forward link of said first channel and for said reverse link of said first channel; and said allotting activity e) allots said first channel to said first unlocked cell if said second interference statistics for said forward link indicate less interference than is indicated by said first interference statistics for said forward link of said first channel and if said second interference statistics for said reverse link indicate less interference than is indicated by said first interference statistics for said reverse link of said first channel.

7. A method as claimed in claim 1 wherein:

said calculating activity d) also calculates a third interference statistic characterizing interference at a second unlocked cell for said first channel in response to said simulating activity c); and said allotting step e) allots said first channel to said first unlocked cell if said third interference statistic indicates less interference than a predetermined threshold.

8. A method as claimed in claim 1 wherein said allotting activity e) comprises:

calculating a third interference statistic characterizing interference at said first unlocked cell for said first channel;

calculating fourth interference statistics characterizing interference at said first unlocked cell for others of said channels; and allotting said first channel to said first unlocked cell if said third interference statistic indicates less interference for said first channel than said fourth interference statistics indicate for said others of said channels.

9. A method as claimed in claim 1 additionally comprising repeating said simulating activity c), said calculating activity d) and said allotting activity e) for a second one of said channels.

10. A method as claimed in claim 1 additionally comprising repeating said simulating activity c), said calculating activity d) and said allotting activity e) for a second one of said unlocked cells.

11. A method as claimed in claim 1 wherein said allotting activity e) allots said first channel to said first unlocked cell if, for all of said locked cells, said second interference statistics indicate less interference for said first channel in each locked cell than is indicated by said first interference statistics for said first channel in each locked cell.

12. A method as claimed in claim 1 wherein said allotting activity e) allots said first channel to said first unlocked cell if said second interference statistics indicate less interference than a predetermined threshold.

13. A method as claimed in claim 1 wherein said allotting activity e) allots said first channel to said first unlocked cell if said second interference statistics and said first interference statistics indicate substantially equal interference for said first channel.

14. A method as claimed in claim 13 wherein said allotting activity e) allots said first channel to said first unlocked cell if said second interference statistics indicate interference for said first channel which is greater than indicated by said first interference statistics for said first channel by an amount of less than 2.0 dB.

15. A method as claimed in claim 13 wherein said allotting activity e) allots said first channel to said first unlocked cell if said second interference statistics indicate interference for said first channel which is greater than indicated by said first interference statistics for said first channel by an amount of less than 0.3 dB.

16. A method for assigning channels in a cellular network to locked cells having prearranged channel assignments and to unlocked cells having channel assignments that are not prearranged, said method comprising the steps of:
   a) allotting channels to said locked cells in accordance with a prearranged assignment plan to effect assignment of said channels in said locked cells;
   b) calculating first interference statistics characterizing interferences at said locked cells for said channels, wherein an interference in at least one of said locked cells is greater than a predetermined interference level;
   c) simulating allotment of a first one of said channels to a first one of said unlocked cells;
   d) determining second interference statistics for said first channel as a result of said simulated allotment of said step c) in a plurality of locked cells and in a plurality of unlocked cells; and
   e) allotting said first channel to said first unlocked cell to effect an assignment of said first channel in said first unlocked cell if:
      interference is determined in each of said plurality of unlocked cells to be less than said predetermined interference level; and
      interference is determined in each of said plurality of locked cells to be less than or equal to a corresponding interference indicated by said first interference statistics for said first channel in each locked cell.

17. A method as claimed in claim 16 wherein said simulating step c) and said calculating step d) are repeated for second through nth ones of said channels, and said allotting step e) comprises the steps of:

forming an available channels list which includes those ones of said first through nth channels for which said calculating step d) calculates interference in each of said plurality of unlocked cells to be less than said predetermined interference level, and for which said calculating step d) calculates interference in each of said plurality of locked cells to be less than or equal to a corresponding interference indicated by said first interference statistics for said first through nth ones of said channels in said each locked cell; and selecting said first channel from those ones of said first through nth ones of said channels included in said available channels list.

18. A method as claimed in claim 17 wherein said selecting step comprises:
   calculating third interference statistics characterizing interferences at said first unlocked cell for those ones of said first through nth channels included in said available channels list; and
   determining if said third interference statistics indicate less interference for said first channel than for others of said first through nth channels included in said available channels list.

19. A method as claimed in claim 16 wherein said allotting step e) allots said first channel to said first unlocked cell if:
   interference is determined in each of said plurality of unlocked cells to be less than said predetermined interference level; and
   for each of said plurality of locked cells, interference is determined to be either less than or equal to a corresponding interference indicated by said first interference statistics for said first channel or to be less than said predetermined interference level.

20. A method for assigning channels in a cellular radio communication network having border cells and interior cells each of which have base stations associated therewith, said network complying with a prearranged assignment plan that dictates assignments of specified channels in specified border cells, said prearranged assignment plan causing at least one of said border cells to have greater than a predetermined interference level, and said method comprising:
   a) calculating first interference statistics characterizing interferences at said border cells for said channels;
   b) simulating allotment of a first one of said channels to a first one of said interior cells;
   c) determining second interference statistics for said first channel as a result of said simulated allotment of said step b) in a plurality of border cells and in a plurality of interior cells;
   d) allotting said first channel to said first interior cell if:
      interference is determined in each of said plurality of interior cells to be less than said predetermined interference level, and
      interference is determined in each of said plurality of border cells to be less than said predetermined interference level, to be less than or equal to a corresponding interference indicated by said first interference statistics for said first channel, or to be greater than said predetermined interference level by an amount of no more than 2.0 dB; and
   e) configuring a base station associated with said first interior cell to operate using said first channel.

21. A computerized apparatus for assigning channels in a cellular network to locked cells having prearranged channel assignments and to unlocked cells having channel assignments that are not prearranged, said computerized apparatus comprising:

an input/output device;

a memory, coupled to said input/output device, wherein said memory stores a computer program;

a processor, coupled to said input/output device and said memory, wherein said processor executes said computer program in response to a command from said input/output device, said computer program comprising:

a first channel assignment segment which assigns channels to said locked cells in accordance with a prearranged assignment plan;

a first interference calculating segment which calculates first statistics characterizing interference at said locked cells for said channels;

an allotment simulating segment which simulates an allotment of a first one of said channels to a first one of said unlocked cells;

a second interference calculating segment which calculates second interference statistics characterizing interference at said locked cells for said first channel based upon said allotment simulating segment; and a second channel assignment segment which assigns said first channel to said first unlocked cell if said second interference statistics indicate less interference for said first channel than is indicated by said first interference statistics for said first channel.

22. A computerized apparatus as claimed in claim 21 wherein:

said second interference calculating segment also calculates a third interference statistic characterizing interference at a second unlocked cell for said first channel in response to said simulating segment; and said second channel assignment segment assigns said first channel to said first unlocked cell if said third interference statistic indicates less interference than a predetermined threshold.

23. A computerized apparatus as claimed in claim 21 wherein:

said second channel assignment segment comprises a third interference calculating segment which calculates a third interference statistic characterizing interference at said first unlocked cell for said first channel;

said second channel assignment segment comprises a fourth interference calculating segment which calculates fourth interference statistics characterizing interference at said first unlocked cell for others of said channels; and said second channel assignment segment assigns said first channel to said first unlocked cell if said third interference statistic indicates less interference for said first channel than said fourth interference statistics indicate for said others of said channels.

24. A computerized apparatus as claimed in claim 21 wherein:

said second channel assignment segment assigns said first channel to said first unlocked cell if, for all of said locked cells, said second interference statistics indicate less interference for said first channel in each locked cell than is indicated by said first interference statistics for said first channel in said each locked cell.

* * * * *